Feb. 11, 1947.  E. M. SHAW  2,415,767
COMPARTMENTED INSULATED LUNCH BOX
Filed June 19, 1943  2 Sheets-Sheet 1
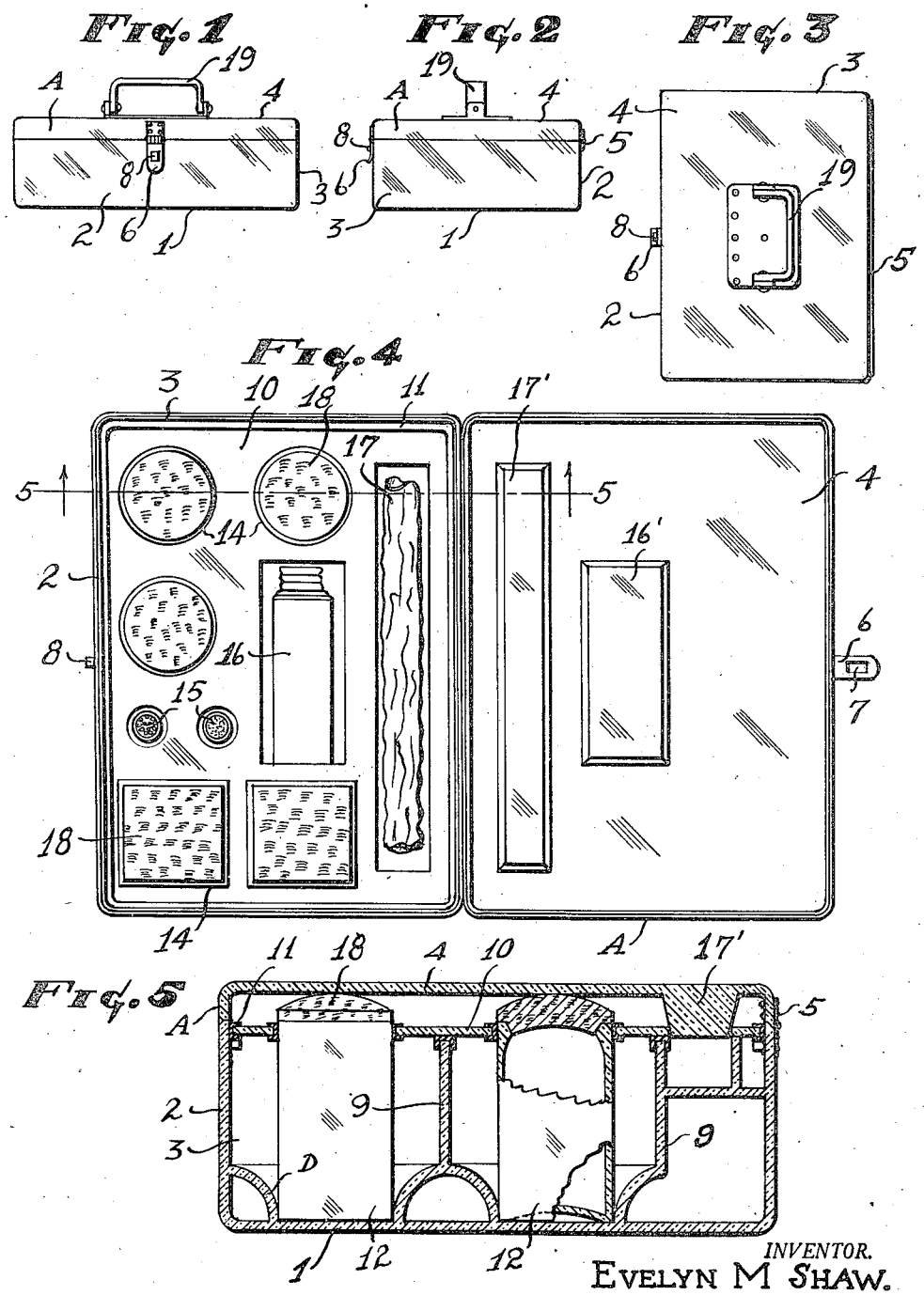
INVENTOR.
EVELYN M SHAW.

Feb. 11, 1947.    E. M. SHAW    2,415,767
COMPARTMENTED INSULATED LUNCH BOX
Filed June 19, 1943    2 Sheets-Sheet 2
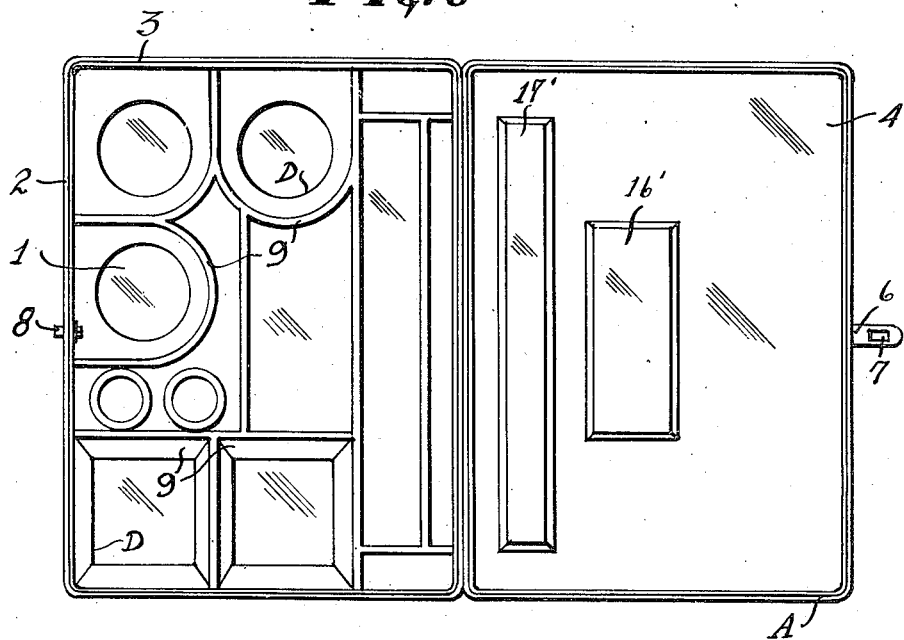
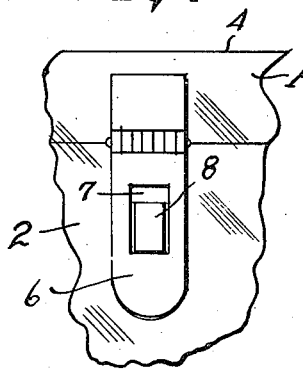
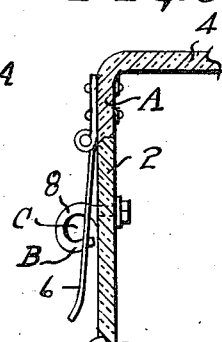
INVENTOR.
EVELYN M. SHAW Patented Feb. 11, 1947

2,415,767

UNITED STATES PATENT OFFICE 2,415,767

COMPARTMENTED INSULATED LUNCH BOX

Evelyn M. Shaw, Wichita, Kans.

Application June 19, 1943, Serial No. 491,460

2 Claims. (Cl. 206—4)

My invention relates to new and useful improvements in a lunch box and has for its principal object to maintain a desired temperature for food substance placed in the box.

A further object of my invention is to provide a box having its interior sub-divided into compartments, said compartments being insulated from each other, whereby opposing temperatures of the compartments will not affect each other.

A still further object of my invention is to provide an efficient sealing means for containers installed in their respective compartments.

A still further object of my invention is to provide a sealing cap for each separate container, each cap being capable of expanding by pressure imposed by the lid of the box when closed thereon and the said lid having a spring tensioning means to accommodate and maintain a constant pressure imposed on the caps of the containers, and the said containers may be opened separately.

A still further object of my invention is to removably secure the containers in their respective compartments, whereby the lunch box as a whole is easily and readily sterilized to maintain the same in a sanitary condition.

These and other objects will hereinafter be more fully explained, reference being had to the accompanying drawings forming a part of this specification, and in which like characters will apply to like parts in the different views.

Referring to the drawings:

Fig. 1 is a front or side view of the box.

Fig. 2 is one end view thereof.

Fig. 3 is a top plan view of the box with the lid closed.

Fig. 4 is an enlarged plan view of the box and lid in their open position to illustrate the position of the containers and other articles in their respective receptacles.

Fig. 5 is an enlarged sectional view taken on line 5—5 in Fig. 4, except the lid being closed.

Fig. 6 is a similar plan view to that of Fig. 4, the containers and other articles being removed.

Fig. 7 is an enlarged front view of the hasp and fragmentary portion of the box.

Fig. 8 is a side view of Fig. 7, the wall and lid portions of the box being in section.

The components of my invention consist of a box-like structure comprising a bottom 1, sides and ends 2 and 3, respectively, and a lid 4, said lid having suitable flanges A downwardly extending to engage on the upper extremity of the said sides and ends, substantially air tight when clamped thereon. The said lid is rockably connected to one side of the box by a piano hinge 5 extending therealong, the other side of the lid having a hasp 6 rockably secured thereto, said hasp having a slot 7 adjacent the free end thereof and through which a staple 8 is insertible. Said staple has one of its legs secured to the front side of the box, the other leg being free to permit springing movement thereof when the slotted hasp is forced to engagement thereover, whereby the lid is tensioned downward to expand sealing caps of containers later described, and the hasp being secured against outward movement where it passes over the crown B of the lower leg of the staple, and at the same time the hasp is free to be forced outward when the lid is to be opened. Furthermore, the hasp may be secured by the use of a padlock applied to the arced opening C of the staple.

The interior of the box is subdivided by partitions 9 whereby compartments are formed in which to seat their respective receptacles well insulated from each other as ample air spaces are provided therebetween as shown in Figs. 5 and 6. Said partitions and space therebetween are capped by a plate 10 removably positioned adjacent the upper extremity of the sides and end walls and made air tight where it joins said walls by a flexible gasket 11 extending therearound. The plate referred to has a plurality of openings therethrough and adapted to receive receptacles 12 insertible therethrough, each of which is made air tight by its respective gasket 14 that is channel-like in cross section and being carried by the plate.

It will be seen in Fig. 5 that the lower end of the tubular containers 12 will seat in annular sockets formed by extending the lower portion of the partitions toward the containers as at D, and likewise the containers that are rectangular in cross section, the latter not shown in said Fig. 5. Pendantly carried by the plate are salt and pepper boxes 15, also receptacles for a thermos bottle 16 and table utensils and napkin 17, the two latter being integrally formed pockets and each having an elongated stopper 16' and 17' to secure their respective articles in the pockets. As means to enclose the herein named containers there is provided for each a cork cap 18, the body of which is concavo convex, the periphery of the caps being shouldered to seat on the upper end of their containers and a portion from the shoulder downward is convergently formed to wedge closely in the mouth of the container and being tightened by the lid pressing downward thereon as the concavity of the cap will cause expansion thereof diametrically as the lid contacts centrally on the convex side of the said cork stoppers.

The lid of the box has a handle 19 secured centrally thereto as carrying means for the said lunch box and the said handle may be applied to the front side of the box if so desired, and other elements specifically described may be modified as lie within the scope of the appended claims.

Having fully described my invention what I claim as new and desire to secure by Letters Patent is:

1. In a lunch box of the class described, said lunch box having a body portion, and a lid hingedly connected to the body portion and hasp means to tension the lid to a closed and locked position, the body portion being sub-divided by walls to form compartments in which to seat receptacles and to provide dead air spaces therearound as insulating means for the receptacles from each other with respect to temperature, receptacles each having a mouth at one end formed by its wall, said wall externally of the mouth being aligned with the wall of the receptacle while the wall of the mouth internally converges inwardly of the receptacle, a flexible concavo-convex stopper to close the mouth, the stopper's wall that seats in the mouth being convergent inward of the receptacle to coincide with the convergence of the wall of the mouth and being expanded to liquid tight engagement by tension of the lid imposed on the convex side of the stopper to flatten the same which in turn will force the convergence of the stopper to tight engagement with the convergence of the mouth.

2. In a lunch box of the class described, as recited in claim 1, the stopper having an annular outward extension at the termination of the stopper's divergence to form a shoulder to seat on the outer extremity of the mouth to restrict the convergence of the stopper from inward movement of the mouth while the stopper is being expanded by tension of the lid, compressing the stopper at its convexed portion axial thereof with respect to a longitudinal axis of the receptacle.

EVELYN M. SHAW.

REFERENCES CITED

The following references are of record in the file of this patent:

UNITED STATES PATENTS

| Number | Name | Date |
| --- | --- | --- |
| 407,957 | Kookogey | July 30, 1889 |
| 1,730,403 | Boland | Oct. 8, 1929 |
| 2,004,122 | Loibl, Jr. | June 11, 1935 |
| 1,948,041 | McCowan | Feb. 20, 1934 |
| 1,509,485 | Primrose | Sept. 23, 1924 |